US010829353B2

(12) United States Patent
Giannetti

(10) Patent No.: US 10,829,353 B2
(45) Date of Patent: Nov. 10, 2020

(54) PROTECTIVE DEVICE MAGNETICALLY APPLICABLE TO THE FORKS OF A LIFT TO MOVE FRAGILE OBJECTS

(71) Applicant: Newtecnik S.r.l., San Giovanni in Marignano (IT)

(72) Inventor: Mirco Giannetti, Misano Adriatico (IT)

( * ) Notice: Subject to any disclaimer, the term of this patent is extended or adjusted under 35 U.S.C. 154(b) by 218 days.

(21) Appl. No.: 16/068,667

(22) PCT Filed: Jan. 23, 2017

(86) PCT No.: PCT/IB2017/050335
§ 371 (c)(1),
(2) Date: Jul. 7, 2018

(87) PCT Pub. No.: WO2017/130093
PCT Pub. Date: Aug. 3, 2017

(65) Prior Publication Data

US 2019/0023546 A1 Jan. 24, 2019

(30) Foreign Application Priority Data

Jan. 28, 2016 (IT) ........................ 102016000008932

(51) Int. Cl.
*B66F 9/12* (2006.01)
*F16F 1/373* (2006.01)

(52) U.S. Cl.
CPC .............. *B66F 9/12* (2013.01); *F16F 1/3737* (2013.01); *F16F 2224/025* (2013.01); *F16F 2224/0208* (2013.01); *F16F 2230/0023* (2013.01)

(58) Field of Classification Search
CPC ... B66F 9/12; F16F 1/3737; F16F 2224/0208; F16F 2224/025; F16F 2230/0023
See application file for complete search history.

(56) References Cited

U.S. PATENT DOCUMENTS 4,735,153 A * 4/1988 Wong ................. B65D 19/0012 108/57.16
5,221,176 A * 6/1993 Allen ........................ B66F 9/12 414/607
5,575,608 A * 11/1996 Yau ........................... B66F 9/12 414/607
5,618,159 A * 4/1997 Wilson ...................... B66F 9/12 187/237
5,897,286 A * 4/1999 Whittaker ................ B66F 9/12 187/237
6,471,465 B2 * 10/2002 Albertyn .................. B66F 9/12 414/607

(Continued)

FOREIGN PATENT DOCUMENTS

| | | |
|---|---|---|
| CN | 203451174 U | 2/2014 |
| EP | 2625034 A1 | 8/2013 |
| JP | H0385394 U | 8/1991 |

*Primary Examiner* — Michael A Riegelman
(74) *Attorney, Agent, or Firm* — Themis Law

(57) ABSTRACT

A protective device for the vertical part of a fork of a lift includes an external layer configured to protect from damage by impact/pressure fragile loads, a magnetic layer for applying the device to the fork magnetically, and a stiffening layer interposed between the external layer and the magnetic layer. Tangential constraint members co-operate with at least a part of a related fixing systems to fix the fork to the lift and to constrain the protective device tangentially to the application surface where it is applied.

11 Claims, 7 Drawing Sheets

12
10
2
3
14
4

(56) References Cited

U.S. PATENT DOCUMENTS

| | | | | |
|---|---|---|---|---|
| 7,229,108 | B2 * | 6/2007 | Hochrein | B60R 13/04 293/128 |
| 9,394,150 | B2 * | 7/2016 | Bow | B66F 9/18 |
| 2002/0105197 | A1 * | 8/2002 | Unterwagner | B60R 13/04 293/128 |
| 2009/0140533 | A1 * | 6/2009 | Keough | B60R 19/42 293/109 |
| 2013/0277151 | A1 * | 10/2013 | Giannetti | B66F 9/183 187/237 |
| 2016/0084697 | A1 * | 3/2016 | Giannetti | H04N 7/18 177/139 |
| 2016/0137469 | A1 * | 5/2016 | Giannetti | B66F 9/184 414/21 |
| 2019/0023546 | A1 * | 1/2019 | Giannetti | B66F 9/12 |

* cited by examiner

FIG. 2
12
10
2
3
14
4
FIG. 3
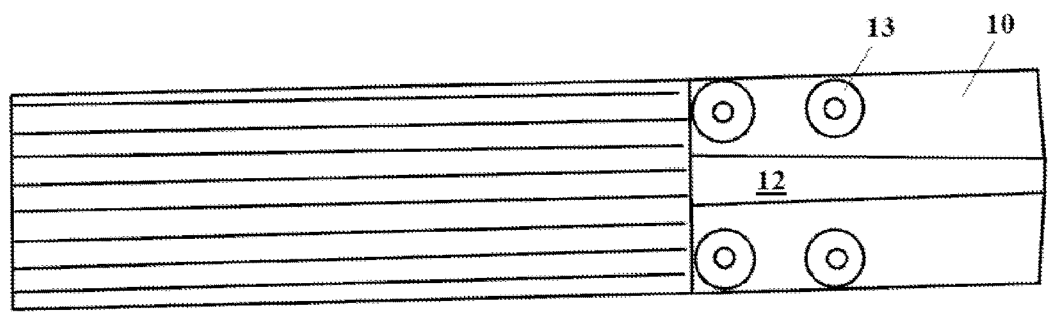
FIG. 4
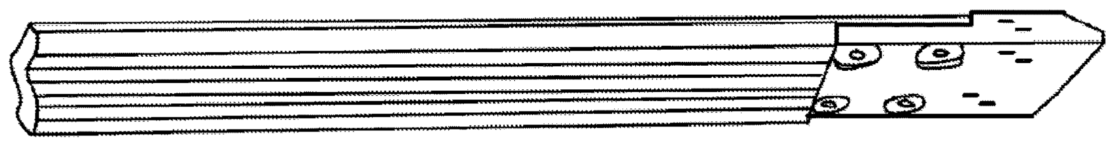

PROTECTIVE DEVICE MAGNETICALLY APPLICABLE TO THE FORKS OF A LIFT TO MOVE FRAGILE OBJECTS

TECHNICAL FIELD

The present invention refers to the technical field of machineries for supporting and/or lifting of loads, such as lift trucks or forks lifters.

In particular, the invention refers to an innovative protective device for preserving fragile material from impacts and frontal pressures, while handled by a forks lifter.

BACKGROUND ART

Lifters have been known for a long time and have been used for handling any kind of loads.

Generally, the lifter foresees two frontal L-shaped forks of predetermined horizontal length. They can be handled vertically and in many cases also horizontally, in such a manner that forks can be moved close each other or distanced.

The use of the lifter (also called lift truck or fork lift in technical language) foresees the insertion of forks under the wood pallet on which various loads to be lifted are placed. Forks penetrates into the pallet until the vertical part of the forks touches the perimeter of the pallet, thus guaranteeing a good insertion of forks and therefore load stability.

At this point, it is activated the vertical handling of the forks that lift the pallet with the whole load on it from the ground, in order to move it from a place to another one of a predetermined area.

The pallet, generally of wood, is a sort of a raised platform which creates a support surface for the load. Precisely to allow the insertion of the forks under it, the pallet is formed by vertical wood beams distanced one from the other one, on which the support surface lies. Vertical beams create the insertion space of the forks.

At the current state, fragile loads handling is critical and often a high risk of damage, dent, scratch of the load itself may take place.

An example is the handling of bottles arranged on pallets for moving them.

Frequently, bottles occupy the whole area of the pallet where they are arranged and therefore, they are flush with the perimeter of the pallet or they even exceed such perimeter. In fact, the arrangement of loads is never precise. Therefore, when the fork is inserted under the pallet and is moved close until the vertical part touches the perimeter of the pallet, such vertical part hits the carried containers quite heavily, if they are protruding. Moreover, in addition to the initial impact, they produce also thrust and pressure action, thus causing the overall breakage of fragile content, for instance bottles.

Therefore, it is necessary to arrange containers on the pallet, in such a manner that they do not protrude out the pallet itself and obviously, such an expedient is very restrictive and it can hardly be obtained practically. Moreover, a particularly careful and slow approaching motion of the forks should be carried out and also this expedient can hardly be carried out daily. In addition, while handling the pallet itself, every load handling may lead the load itself to hit the vertical side of the forks, thus causing the contents breakage.

A European patent EP2625034 in the name of Giannetti Mirco is known over the prior art, wherein the magnetic protection for the forks is described.

The described protection is made of strips applicable to cover specifically the horizontal part of the fork and each strip is made of a magnetic layer, an overlapping stiffening layer, preferably of metallic type and an upper rubber layer which is in direct contact with the load, thus reducing the risk of slipping and scratches of the same load.

Therefore, the strip can be applied to the forks rapidly, thanks to the protection of the forks and such protection of the forks allows to handle loads without the risk of scratching them and with a remarkable friction, which reduces the risk of slipping.

In an embodiment described in figures from 8 to 10, the covering strip is exceeding in length in respect to the length of the fork on which it has to be applied, in such a manner that said exceeding part can cover the vertical part of the fork. In this way, it is de facto created also a protection against impacts of such vertical part of the fork when this further one touches a load accidentally.

However, the exceeding part of the strip described in EP2625034 is lacking the intermediate stiffening layer, therefore, it has scarce stiffness and risks a change of position or adherence loss if it is pressed excessively, even if the horizontal part is pushed by the load.

Moreover, such solution described in EP2625034 is not recommendable for lifting loads arranged on pallets but it is recommendable for loads to be lifted directly without pallets. The wood pallet would damage the rubber of the fork cover, thus making it unusable after few handling cycles. In this sense, even if the solution described in figures from 8 to 10 also for protection from impacts in case of fragile loads arranged on pallets, nevertheless, such fork cover, would have an extremely scarce duration cycle.

DISCLOSURE OF THE INVENTION

It is therefore the aim of the present invention to provide a device 1 fork cover which solves said technical inconveniences.

In particular, it is the aim of the present invention to provide a device 1 fork cover which preserves from damage by accidental impacts/pressures fragile loads against the vertical part of the fork, thus resulting besides a long-lasting and reliable device.

These and other aims are therefore obtained through the present device applicable to the vertical part (552) of a fork (500) of a lift, as per claim 1.

Such device (1) comprises:

An external layer (2) configured to preserve from damage by impact/pressure fragile loads;

A magnetic layer (4) for applying the device to said fork magnetically;

A stiffening layer (3) interposed between the external layer and the magnetic layer.

The external layer, for example, may be made of rubber, as such material has good amortizing characteristics and energy absorbing, as it is highly deformable.

Normally, the magnetic layer allows a rapid application and the stiffening layer preserves the device from bends which may cause an accidental detachment.

In order to avoid accidental detachments in use, such device further comprises tangential constraint means (20, 21) configured to result co-operating with at least a part of the relative fixing systems to fix the fork to the lift in such a way as to constraint said device (1) tangentially to the application surface where it is applied.

In fact, being such device assigned to the application to the vertical part of the fork for preventing fragile materials from impacts, it is not subjected de facto to high pressure forces as the case of EP2625034. In EP2625034 the fork cover was arranged on the horizontal part of the fork and therefore the whole weight of the handled load acted on it. The weight, together with magnets, guarantees a good adherence. In the present case of application to the vertical part of the fork, such fork covering is no longer subjected to any weight load but only to the potential pressure whereby the lifter pushes forks against the load to be lifted. In this sense, the magnet alone cannot guarantee a block against tangential motions which may cause an accidental detachment and therefore a further locking system is necessary.

Therefore, according to such solution, a tangential constraint is obtained, thus guaranteeing a good solidity of the device.

Further advantages are inferable from the depending claims.

BRIEF DESCRIPTION OF DRAWINGS

Further features and advantages of the device, according to the invention, will result to be clearer with the description that follows of some embodiments, made to illustrate but not to limit, with reference to the attached drawings, wherein:

FIG. 2 shows a longitudinal section;

FIG. 3 is always a view from above on the side of the rubber;

FIG. 4 is a further axonometric view;

FIG. 9 shows such two elements separated while FIG. 10 shows the two components coupled.

FIGS. from 11 to 13 show an example of use.

DESCRIPTION OF SOME PREFERRED EMBODIMENTS

Figure 1:
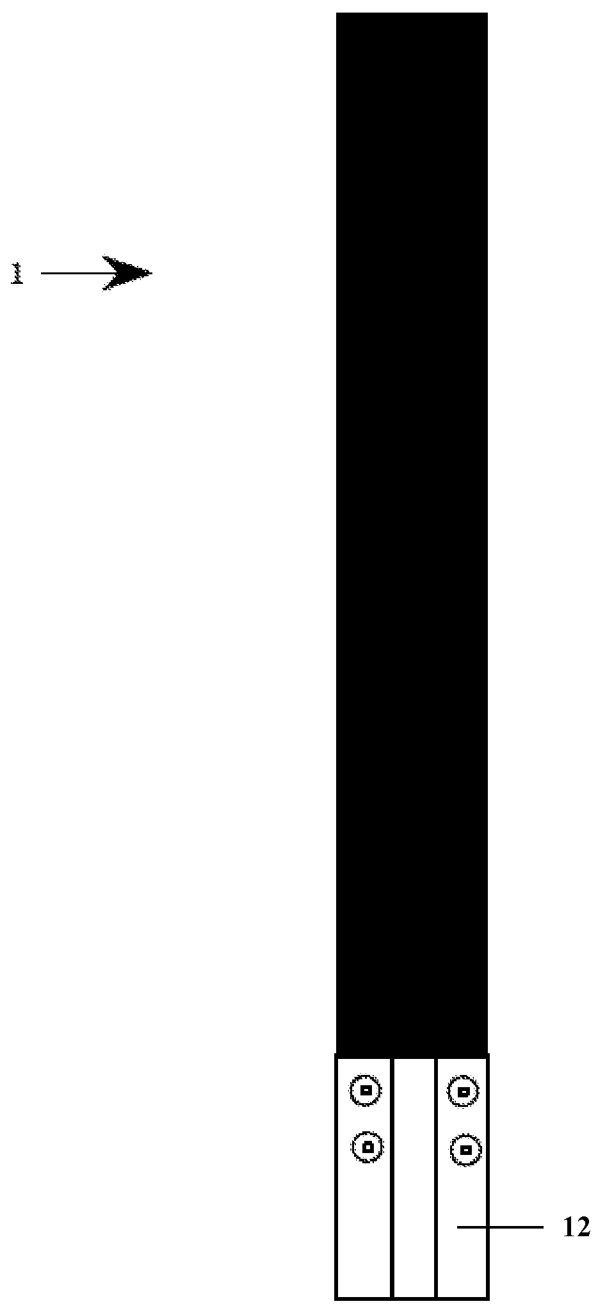
FIG. 1 shows a view from above on the side of the rubber, of the device, according to the present invention.

With reference to FIG. 1, it is described a device according to the present invention.

As it is better highlighted in FIG. 2, it is formed by three overlapping layers.

The layers are in form of strip of a predetermined thickness, in such a manner that the device traces more or less the form of the area where it is applied.

The external layer 2 is made of rubber, because, as it is better described further, such material has good characteristics of softness and deformability and so, as well known, it has good protective purpose against impacts and therefore cushioning.

A rubber of SBR type can be used for example, even if any kind of rubber is fine.

The layer foreseen for being adherent to the surface of the fork is a layer of magnetic material 4, in such a manner that such device can be applied rapidly through the action of attraction carried out by the magnet on the iron material making the fork.

From the external layer of rubber and the magnetic one is then interposed a stiffening layer 3 which is necessary for avoiding inflections due to loads acting on the strip in use. In fact, such inflections would cause the detachment of the strip from the area where it is applied. In addition, as clarified further, the intermediate layer provides a support for connecting the other parts, such as the part of end 10 (also called shoe 10) and bolts 20 to prevent from tangential motion.

The stiffening layer 3 is preferably made of metallic material, for example iron or steel.

Even if rubber is a preferred material for its characteristics and its workability, other soft material with similar characteristics might be used, such as, for example, polyurethane material (for example of foamy type), foam rubber, silicone, etc.

Particularly rigid materials, such as plastic, PVC, metals, alloys, wood, etc. cannot be used.

As highlighted in FIGS. 1 and 2, it is foreseen a terminal part 10 to one side, which is a single piece of hard material, for example metal or metallic alloy as aluminum, iron, cast iron, etc.

The use of aluminum is preferred for its characteristics of lightness and resistance.

As shown in schematization of FIG. 2, such terminal part has an overturned L-shape and foresees an upper surface 12 pointed towards the part of the rubber layer and better visible in detail of FIG. 3.

As it is inferable in FIGS. 2 and 3, connecting screws 13 are foreseen connecting such terminal part to the device.

Therefore, threaded holes are foreseen with enlarged head of enough depth, such that the head of screw 13 is retractable inside them, thus preventing it from protruding and modifying the form of surface 12. In this way, as better described further, it is avoided the generation of protrusions or points that may lock against the structure of the pallet itself, contributing to an accidental disconnection of the device 1.

As already said, the terminal part has more or less an overturned L-shape, thus forming a flattening 14. On that flattening 14 are lying the two magnetic and stiffening layers which form an exceeding part of the device. Therefore, the above-mentioned screws 13 penetrate at least into the metallic layer, thus connecting integrally such terminal part 10 to the rest of the structure.

Figure 5:
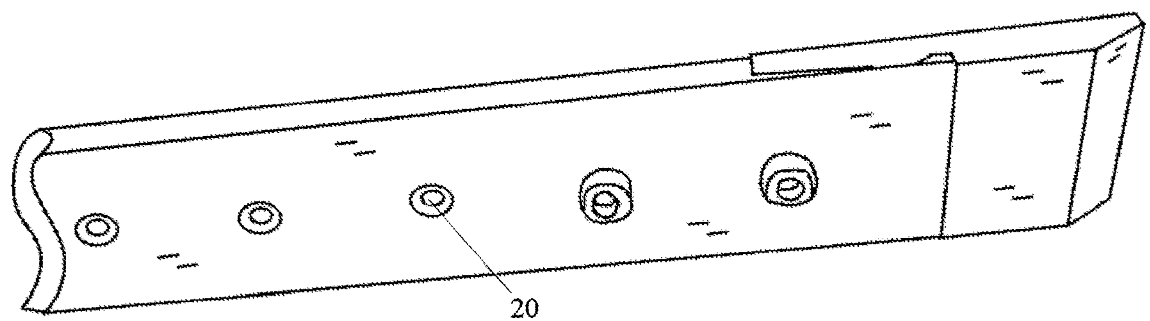
FIG. 5 and FIG. 6 are two views on the side of the magnet; in particular, FIG. 6 highlights the spacer end and a part of the magnetic layer and rubber connected to it.
Figure 6:
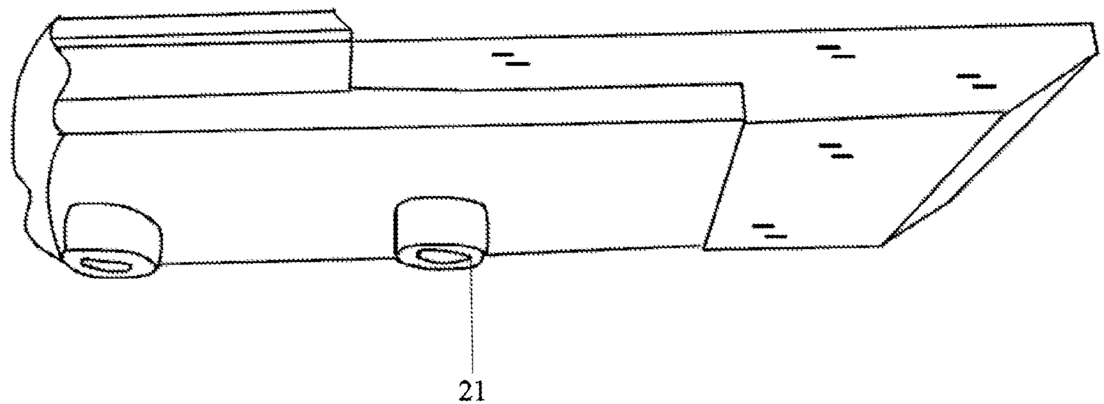

FIG. 4 shows further such terminal part always from the side of rubber while FIG. 5 and FIG. 6 show it clearly from the part of the magnet.

As it is inferable from FIG. 3, the upper surface 12 is not flat but is preferably sloping as a roofing. In particular, there is a central flat strip from which the two sides branch off tilted downward.

This sloping form of the surface reduce the potential contact area between such terminal part and the wood structure of the pallet, thus further reducing the risk of getting stuck in some protuberance of the pallet itself.

Referring to FIG. 5 and FIG. 6, it is highlighted how a certain number of holes 20, which can penetrate up to the intermediate layer, are obtained sequentially on the magnet. Such holes 20 are preferably threaded and allow to screw rapidly and interchangeably bolts having a head 21.

Therefore, such screwed bolts form a protuberance 21 which results fixed to the device 1.

Figure 7:
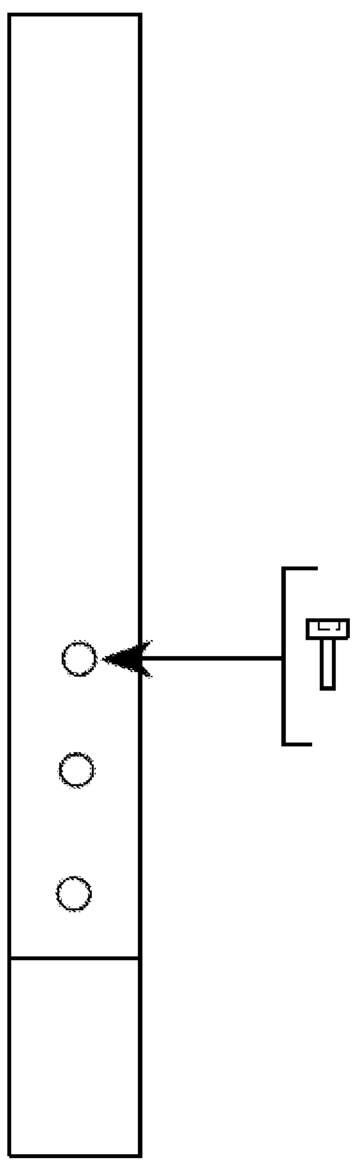
FIG. 7 is always a view from above on the side of the magnet where bolts are applied constrained to the fixing bolts of the fork to the lifter.

FIG. 7 outlines the holes wherein one or more bolts can be inserted in a removable manner in the holes obtained on the magnetic layer.

Figure 8:
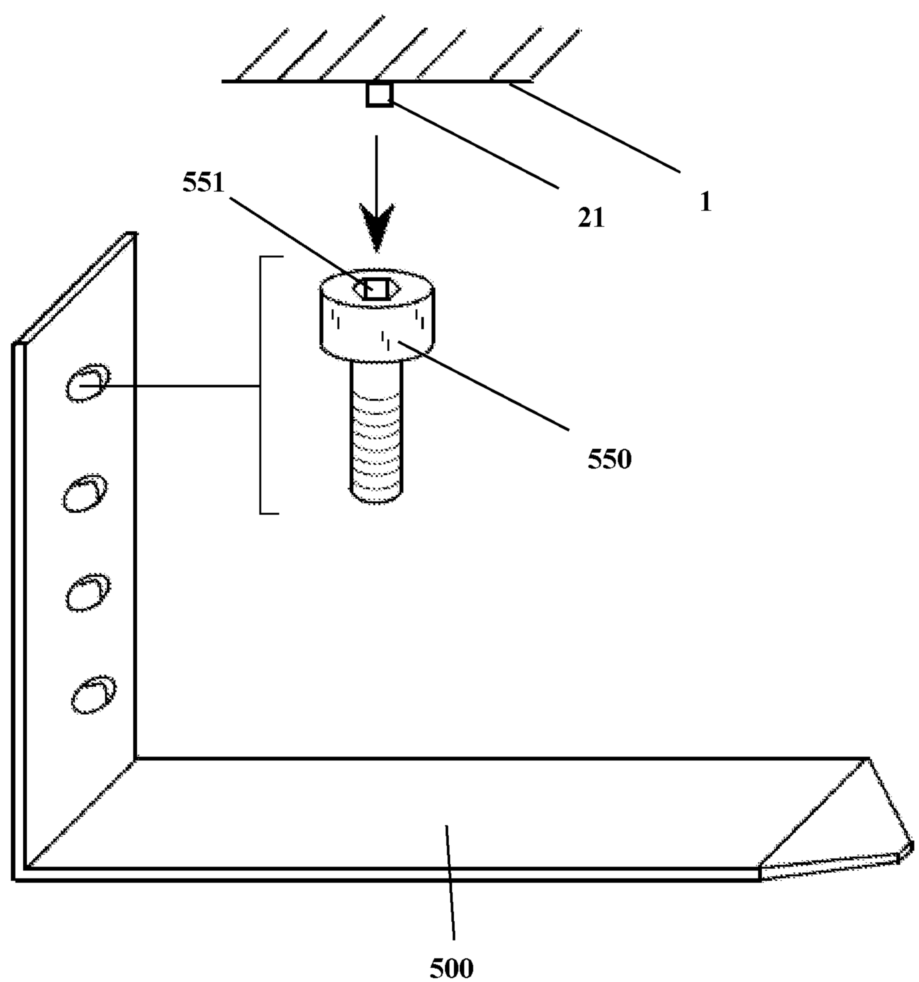
FIG. 8 shows further such coupling between the bolts applied to the device object of the invention and those ones on the fork.
Figure 9:
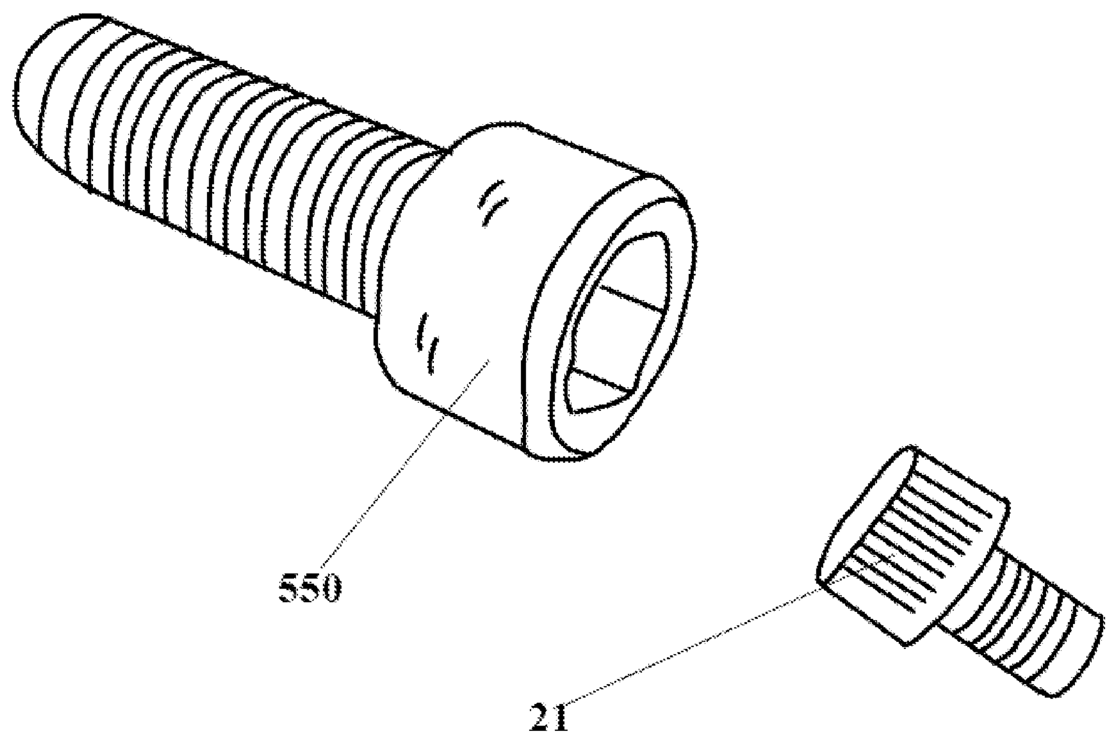
FIG. 9 and FIG. 10 show respectively the bolt used for connecting the fork to the structure of the lifter and the screw usable in the device 1; in particular.
Figure 10:
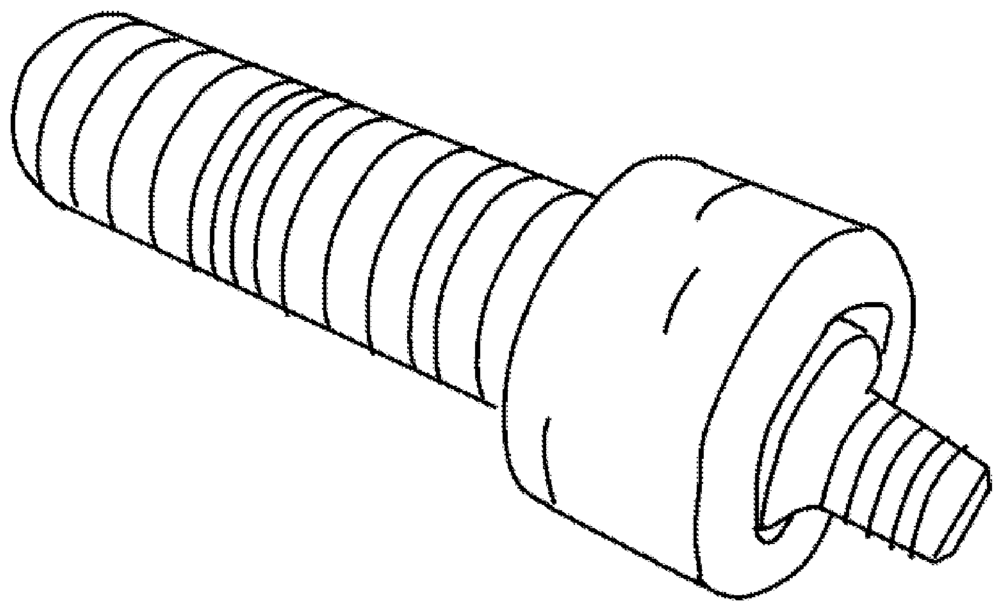
Figure 11:
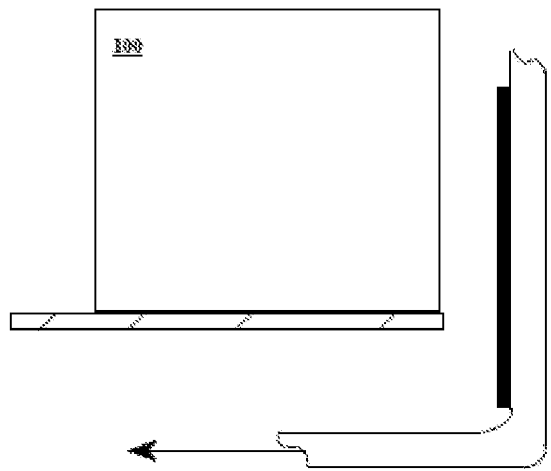
Figure 12:
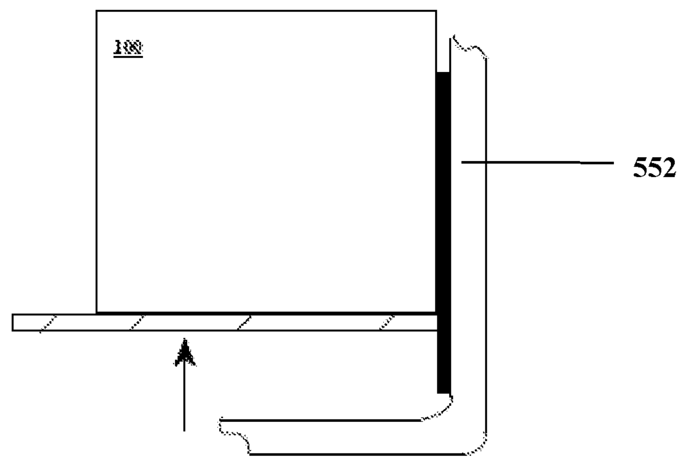
Figure 13:
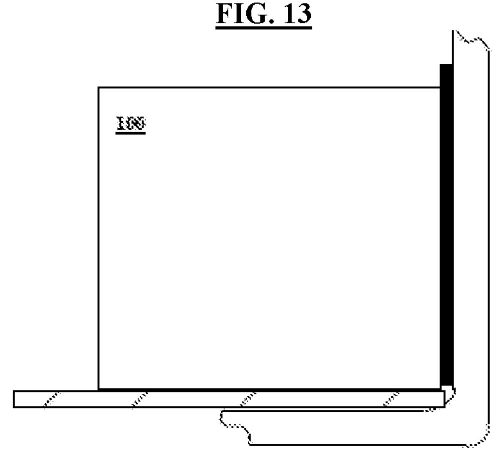

As better shown in the example of FIG. 8, a fork 500 is generally fixed to the structure of the lifter through a predetermined number of screws 550.

The screws inserted in the device 1 make use of hole 551 which is in such bolts 550, such hole being generally hexagonal and anyway, regardless of its size, suitable to allow the insertion of a special wrench to tighten/screw/unscrew the bolt itself.

Therefore, in the device 1 bolts 21 are selected, the head of which is of such a size as to be able to be inserted in such hole 551.

In this way, a block for the tangential sliding of the device is generated (tangentially in respect to the surface where it is applied).

Therefore, even a plurality of threaded holes in the device 1 allows to arrange one or more bolts 21 to different distances, thus adjusting themselves to any number and arrangement of bolts 550 of the fork, it is also possible to replace such bolts 21 with one or more fixed protuberances.

In a further embodiment, elements with a wide hollow head might be used, suitable for holding inside it the head of the bolt 550.

However, the preceding solution is the preferred one, as, generally, the size of bolts 550 are quite large and, therefore, it is easy to obtain the desired block with small bolts applied to the device 1.

Having stated that, it is further explained the utility of such protuberances 21.

Therefore, even there is a magnetic connection, the use of such device is foreseen for the vertical part of the forks to avoid the direct impact of them against the fragile material on the pallet. In that sense, a load weight force of the load itself does not act on such devices, as it takes place with the strips described in EP2625034, such force pushing them against the load themselves, thus guaranteeing its immobility. An excessively oversized magnet would be necessary to guarantee the fastening of the device to the fork, thus preventing the device from slipping tangentially in respect to the fork, in case of forces parallel to the surface of the fork where it is applied. Therefore, the described solution, in simply way, allows to fix the described device 1 tangentially to the fork.

Such protuberances, being both in form of heads of bolts or of fixed elements integrated in the device, they are constrained to seats 551 for fastening the fixing bolts to the fork and, in combination with the magnet, blocking substantially any tangential sliding.

Constructively, such device is easily realizable in mould.

The metallic strip can be arranged inside the already holed mould. The mould is formed by two parts closable at a certain pressure/temperature value.

The rubber is spread out in a part of the mould in a semi-liquid state. The magnetic substance is arranged in pasty form to in the other part of the cast and it is spread on the metallic layer.

The two moulds are coupled by pressure and temperature for enough time until the rubber englobes laterally the metallic layer and the magnet thickens to the metallic layer.

During the forming process, a bond takes place through the implicit adhesive features of the solidifying materials.

Differently, it would also be possible to realize the three layers separately and unite them successively, for example by using glue.

The metallic layer is generally treated to facilitate the adherence between the parts.

Successively, the terminal part 10 is connected through screws, as described above.

As the example in FIG. 3, the rubber can be shaped externally with a series of longitudinal ribs whose aim is to give a stronger amortizing effect.

Generally, as inferred from figures, the rubber layer results slightly high in respect to the surface 12 of the terminal part of rigid and hard material.

In this way, in use, a contact of such ribs takes place shortly before the contact of the shoe with the pallet, thus creating a preceding amortizing effect, thanks to such ribs which become floppy while approaching.

The thickness can be variable depending on needs.

For example, thickness of approximately 3 mm for the intermediate layer, of approximately 2 mm of magnet and approximately of 15 mm of rubber can be realized.

Having described the invention structurally in its entirety, it is now described its use and functioning.

In use, it is enough to apply the device as described to cover the vertical part of the fork, in such a manner so as to create a protection of the fork itself which avoids a direct contact between the metal of the fork and potential fragile material on the pallet.

In the sequence of FIG. from 11 to 12, it is highlighted how the device 1 (full black strip), in its simplest embodiment, might be without the terminal part 10 and, nevertheless, it would work for the preset aims.

However, the sequence outlines the application of a device 1 without such terminal part and highlights how, while handling the fork to lift the pallet, the fork is inserted under the pallet until the vertical part of the fork touches the pallet and then is raised until it meets the loading surface and then it raises the whole load.

In this raising motion, following the contact of the vertical part of the fork with the wood pallet, an inevitable action of tear/abrasion on the device 1, which tends to ruin itself rapidly. In addition, in practical cases, the strip is not always applicable in a higher position to prevent it from scratching against the pallet while lifting the fork after the approaching motion.

For this purpose, in order to increase the working life of the device, such terminal part 10 has been inserted in the preferred embodiment.

The strip is applied in such a manner so as the terminal part results arranged to the side of the pallet, therefore turned towards the horizontal part of the fork in the intersection area of this one with the vertical part (preferably in touch with the horizontal part of the fork). During the advancement movement of the fork, the operator will advance until the forks touches the pallet. Thanks to the arrangement of the metallic part, such metallic part will touch the pallet and rub with it in the raising motion, while the rubber will be in contact the load only.

Therefore, when, for example, the load is arranged protruding out the surface of the pallet, the approaching motion of the fork will not cause any breakage, as the potential contact will be between the soft material (such as rubber) and the carried container. Once inserted the fork, it is lifted until it touches the support surface, but, in this motion, the only terminal part rubs against the pallet, thus protecting the rubber. Subsequently, the load is lifted, thus protecting it from any accidental impact and absorbing the impact and the hit.

The invention claimed is:

1. A protective device (1) applicable to a vertical part (552) of a fork (500) of a lift and comprising:

an external layer (2) configured to preserve from damage by impact or pressure fragile loads;

a magnetic layer (4) for applying the protective device to said fork magnetically;

a stiffening layer (3) interposed between the external layer and the magnetic layer; and tangential constraint means (20, 21) configured to cooperate with at least a part of a related fixing system to fix the fork to the lift in such a way as to constrain said protective device (1) tangentially to an application surface.

2. The protective device (1), as per claim 1, wherein the external layer (2) is made from rubber.

3. The protective device (1), as per claim 1, wherein the external layer (2) presents a plurality of ribs.

4. The protective device (1), as per claim 1, wherein said stiffening layer (3) is made from metal.

5. The protective device (1), as per claim 1, wherein said tangential constraint means (20, 21) are in form of bolts or screws screwed in a removable manner through at least the magnetic layer.

6. The protective device (1), as per claim 5, wherein said bolts or screws have a size dimensioned to be inserted in a hole (551) present in a head of the bolts (550) used to fix the fork to the lift.

7. The protective device (1), as per claim 5, wherein said tangential constraint means (20, 21) are in form of protuberances (21) emerging from the magnetic layer and have a size dimensioned to be inserted in a hole (551) present in a head of the bolts (550) used to fix the fork to the lift.

8. The protective device (1), as per claim 1, wherein at an end of said protective device a terminal part (10) in hard material is present.

9. The protective device (1), as per claim 8, wherein the hard material is metal or a metallic alloy.

10. The protective device (1), as per claim 8, wherein said terminal part (10) presents a surface (12) directed to the part of the external layer made in rubber and having an inverted V form.

11. The protective device (1), as per claim 1, wherein the external layer (2) is selected from the group consisting of:

a polyurethane material;

a foam rubber; or silicone.

* * * * *